Patented Sept. 11, 1934

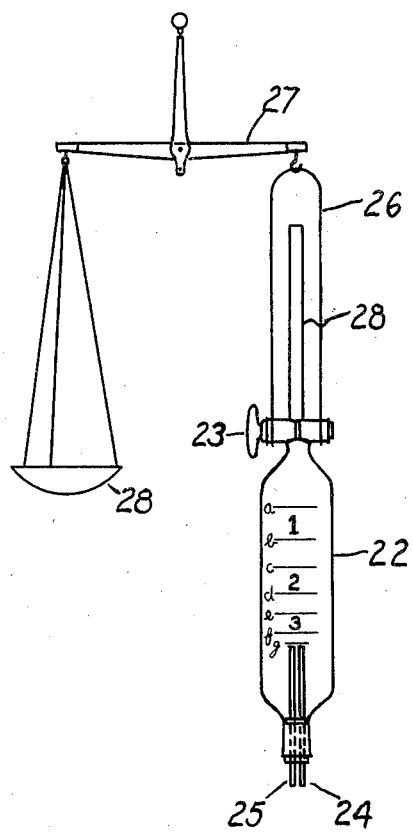

1,973,297

UNITED STATES PATENT OFFICE 1,973,297

PLASTOMETER

Walter L. Shearer, Trenton, N. J.

Application November 3, 1932, Serial No. 640,992

1 Claim. (Cl. 265—11)

This invention relates to the art of measuring plasticity or plastic flow and is particularly concerned with means for the mechanical measurement of the viscosity or of the consistency of such viscous or plastic bodies as true liquids or suspensions of solid, liquid or gaseous bodies in liquid media. Many instruments are in use for measuring the viscosity of various fluids and these are often incorrectly applied in the ceramic, paint and other industries in an attempt to measure "viscosity" on a fluid body which is in fact plastic in nature. My invention consists of forms of apparatus suitable for distinguishing a viscous from a plastic fluid and suitable for giving an accurate measure of the viscosity or the plasticity of the fluid on which it is employed.

A fluid body when made to flow at different constant rates through a tube of suitable size exhibits a certain relationship between the different rates of flow and the pressures causing each of these different rates of flow. If the fluid is a true liquid it has the property known as viscosity, and if it flows through a tube under such conditions that no turbulence is induced in the tube the rate of flow through the tube is directly proportional to the applied pressure causing the flow. Necessary conditions for the avoiding of turbulence are that the tube shall be of sufficiently small diameter and of sufficiently great length and of sufficient uniformity in section and smoothness of wall surface for the series of pressures employed. Turbulence is the disordered motion effect produced when the progression of the individual particles of fluid through the tube "breaks" from a smooth straight line slipping of layer over layer in a direction parallel to the axis of the tube. When turbulence occurs the flow from the tube is retarded to an indefinite extent and the pressure-rate of flow observations are no longer significant as a means of measuring directly the viscosity or plasticity of the fluid. In order to make a reliable measurement it is necessary to use an apparatus in which the size of the tube and the pressure employed are suitable for the fluid being investigated.

The viscosity of a liquid is one of its inherent properties. The viscosity is different at different temperatures and it may be altered, usually to a relatively slight extent, by small additions of other materials. Similarly the plasticity of a suspension of solid particles in a liquid medium is an inherent property of the suspension. The plasticity is different at different temperatures. Of greatest importance, however, is the fact that the plasticity can be enormously altered by slight additions of foreign substances to the suspension although these additions in some instances may be so minute as to escape detection by ordinary chemical means. The forms of apparatus comprehended by this invention are useful for obtaining a technical measure of the plasticity of a fluid and are employed in connection with the adjustment of this plasticity to a suitable working value although they are not necessarily capable of being employed for measuring in absolute units all of the factors involved in the various departments of plastic flow.

The drawing shows one form of plastometer embodying my invention. The fluid to be tested is contained in a transparent bulb such as a glass tubular bulb having a cylindrical section as shown.

Since the rate of flow of a suspension of solid particles in a liquid medium is very greatly dependent upon the proportion of solid to liquid present, it is important that information pertaining to this proportion be obtained when making any measurement. In dealing with such a system as water plus clay or other solid insoluble mineral in finely divided form, where the liquid has a specific gravity appreciably different from that of the solid (such as 1.0 for water and 2.6 for clay) the specific gravity of a mixture of the liquid and the solid is dependent upon the proportion of the two mixed. Consequently the proportion of solid to liquid can be ascertained by measuring the specific gravity of the suspension. In the form of apparatus illustrated provision is made for measuring the specific gravity of the fluid to be tested. The transparency of the container is essential for the making of the plasticity test.

In the apparatus shown in the drawing the glass pipette 22, which is of cylindrical section over the greater part of its length, is graduated and marked off volumetrically. In the preferred form which will be described the total capacity of this bulb is approximately 170 ml. The outside diameter of this bulb is approximately 42 mm. and the length over the straight walled or cylindrical section is appoximately 12 cm. This is graduated in the following manner: About 1 cm. below the start of the cylindrical section in a direction proceeding away from stop-cock 23 a line $a$ is marked. Line $b$ is placed below line $a$ such distance that the volume included between these two marks, designated as space 1 is 25 ml. Line $c$ is 20.5 ml. below $b$, $d$ is 19.3 ml. below $c$, $e$ is 15.2 ml. below $d$, $f$ is 15.0 ml. below $e$ and $g$ is 10.0 ml. below $f$. The space between lines $c$ and $d$ is designated as 2 and the space between lines e and f is designated as 3. The flow tubes 24—25 are made just equal in length to the distance between lines a and f and they are mounted so that their upper ends are below line g, measuring distances along the axis of the apparatus, a distance equal to the height of the meniscus of the slip to be tested (averaging about 3 mm.). The object thus attained is to have the ratio of the volume of space 1 to the distance from the lower end of the flow tubes to the center of space 1 the same as the ratio of the volume of space 2 to its average height, the ratio of the volume of space 3 to its average height being likewise the same value. Flow tubes of larger diameter may be used for thicker slips. It is found possible in practice to cover the range of consistencies ordinarily encountered in ceramic work with two sets of flow tubes having internal diameters of 0.0925″ and 0.156″ respectively. The bottom or exit end of the flow tube must always occupy the specified position with respect to the level of the line g. The flow tubes may conveniently be held in position by means of a rubber stopper having appropriate holes through it. It is essential for the proper functioning of the apparatus and for obtaining uniform results that the glass bulb 22 be cylindrical in shape over the portion graduated and that the flow tubes be of the length specified and mounted so that the lower end is the specified distance below the bulb graduations. The element 26 is a wire or other means for suspending the plastometer from one arm of an equal arm balance 27. The scale pan 28 suspended from the other arm of balance 27 is of sufficient weight to just counterbalance the empty plastometer.

In using this plastometer the lower ends of the flow tubes 24—25 are immersed in the fluid to be tested and this fluid is then sucked into the bulb 22, by applying suction to the upper end of tube 28, until it is just filled up to the stopcock 23 which is then closed thereby holding the fluid in place. The plastometer is then suspended from the balance arm 27 and the weight of the fluid filling the bulb (thereby its specific gravity) is obtained by adding weights on pan 28 until a balance is obtained. The stopcock is then opened and the fluid being tested runs out of the flow tubes 24—25. As the level of the liquid in the bulb passes over the spaces marked 1, 2, 3 the respective times are observed with the aid of a stop watch. With spaces 1, 2 and 3 marked off and the flow tubes placed as specified, a viscous liquid on being tested (if it is sufficiently viscous to prevent the occurrence of turbulence in the flow) will show equal time intervals for each of the three spaces since the average height of each space above the lower end of the flow tube (which determines the pressure causing the flow) is directly proportional to the volume of that space. If the fluid being tested is a plastic flowing body the times will be successively greater usually with a slightly increased time for space 2 over space 1 and a more greatly increased time for space 3 over space 2. The amount of increase in time over the successive spaces considered along with the actual time furnishes a direct estimate of the plasticity of the slip. A curve may be plotted showing average rates of flow corresponding to the average pressures causing these rates of flow for the different plastic slips.

Although the above dimensions do not have to be strictly adhered to for the successful working out of the principle involved in measurements with this plastometer, the apparatus should preferably be made with these dimensions closely followed in order that results obtained with different instruments may be directly compared. The method of manufacture of the form shown in the drawing whereby the flow tubes are made equal in length to a distance on the glass scale such as a to f which corresponds to a definite volume of the bulb 22 compensates for slight unavoidable variations in the size of the glass bulb.

Having described my invention and the way in which it is used, I claim:

Apparatus for measuring the plasticity of fluids, comprising a transparent container, a flow tube communicating with one end of said container, said container having graduations demarking spaces of successively decreasing volumes in the direction of the flow tube, the magnitudes of said spaces being so related to their respective heights above the free end of said flow tube as to cause equal periods of flow of a given liquid from said spaces.

WALTER L. SHEARER.